US006755512B2

(12) United States Patent
Sanada

(10) Patent No.: US 6,755,512 B2
(45) Date of Patent: Jun. 29, 2004

(54) LIQUID DROPLET EJECTION APPARATUS AND INKJET RECORDING HEAD

(75) Inventor: Kazuo Sanada, Kanagawa (JP)

(73) Assignee: Fuji Photo Film Co. Ltd, Kanagawa (JP)

( * ) Notice: Subject to any disclaimer, the term of this patent is extended or adjusted under 35 U.S.C. 154(b) by 0 days.

(21) Appl. No.: 10/207,040

(22) Filed: Jul. 30, 2002

(65) Prior Publication Data

US 2003/0020783 A1 Jan. 30, 2003

(30) Foreign Application Priority Data

Jul. 30, 2001 (JP) ....................................... 2001-229403

(51) Int. Cl.[7] ................................................ G01D 15/16
(52) U.S. Cl. ......................................................... 347/68
(58) Field of Search ............................... 347/66, 68, 70

(56) References Cited

U.S. PATENT DOCUMENTS

| | | | | | |
|---|---|---|---|---|---|
| 3,747,120 | A | | 7/1973 | Stemme | 349/68 |
| 4,608,577 | A | * | 8/1986 | Hori | 347/66 |
| 5,021,808 | A | * | 6/1991 | Kohyama | 347/66 |
| 5,170,187 | A | * | 12/1992 | Oikawa | 347/66 |
| 5,546,108 | A | * | 8/1996 | Hotomi et al. | 347/66 |
| 6,226,018 | B1 | * | 5/2001 | Suzuki | 346/140.1 |

FOREIGN PATENT DOCUMENTS

| | | |
|---|---|---|
| JP | 48-9622 | 2/1973 |
| JP | 54-051837 | 4/1979 |
| JP | 11-309850 | 11/1999 |

* cited by examiner

*Primary Examiner*—Stephen D. Meier
*Assistant Examiner*—Julian D. Huffman
(74) *Attorney, Agent, or Firm*—Whitham, Curtis & Christofferson, P.C.

(57) ABSTRACT

The liquid droplet ejection apparatus includes a liquid holding material which has three-dimensional voids communicating three-dimensionally with one another at least up to a liquid droplet ejection surface and an array of a plurality of ejection devices each of which applies ejection energy to a part of liquid held in the thee-dimensional voids of the liquid holding material, thereby ejecting fine liquid droplets from the liquid droplet ejection surface, wherein the fine liquid droplets are ejected in accordance with each of the ejection devices of the array. The inkjet recording head uses the liquid droplet ejection apparatus for an ink ejection means as it is or in a form of a one-dimensional, two-dimensional or three-dimensional arrangement. Accordingly, a new liquid droplet ejection apparatus and a new inkjet recording head are realized with no need of a large number of nozzles to eject liquid droplets and individual ink flow paths formed for respective nozzles, of a heater, an actuator or the like which is corresponding to each nozzle.

22 Claims, 5 Drawing Sheets

LIQUID DROPLET EJECTION APPARATUS AND INKJET RECORDING HEAD

BACKGROUND OF THE INVENTION

The present invention belongs to the technical field of liquid droplet ejection apparatuses used in ink jet devices for recording or coating by ink droplets ejected from an ink droplet ejection surface onto an open space and flying therein, and, more particularly, relates to a liquid droplet ejection apparatus of a new structure that does not have individual fluid flow paths associated with individual ejection units and also to an inkjet recording head utilizing this liquid droplet ejection apparatus.

Thermal inkjet systems in which ink droplets are ejected from nozzles by the expansion force generated by rapidly vaporizing a portion of ink under heating with heaters is applied to various printers and plotters (See JP 48-9622 A, JP 54-51837 A, etc.).

Further, there is also known an electrostatic type or piezoelectric type inkjet printer or inkjet plotter in which ink droplets are ejected from nozzles by the energy generated by vibrating diaphragms by actuators making use of static electricity, a piezoelectric element or the like (See JP 11-309850, etc.).

An inkjet recording head that performs inkjet image recording generally comprises a large number of nozzles arranged in one direction, ink ejection units such as heaters or actuators provided to the individual nozzles, individual flow paths for feeding ink to the respective ejection units (nozzles) or ink chambers for the respective ejection units, and an a common ink flow path for feeding ink to the individual ink flow paths or ink chambers.

Further, to the common ink flow path, ink is fed from an ink tank mounted on a printer (head unit) via an ink feed path formed in a frame on which an inkjet recording head is mounted.

Such an inkjet recording head is manufactured by utilizing a semiconductor manufacturing technology which can perform minute processing even an inkjet recording head that has so high a nozzle density that exceeds 600 npi (nozzle/inch) is already realized.

However, in the known inkjet recording head having the structure described above, it is necessary to provide a large number of nozzles and individual ink flow paths or ink chambers for feeding ink to ejection units corresponding to the respective nozzles; this turns out to be an obstacle to a further scale-down in some cases.

SUMMARY OF THE INVENTION

It is an object of the present invention to solve the prior art problems described above by providing a liquid droplet ejection apparatus utilized in an inkjet recording head, etc. and, more particularly, a novel liquid droplet ejection apparatus which can eliminate the need for a large number of nozzles for ejecting liquid droplets, and liquid feed units which are provided independently for each liquid droplet ejection and which includes individual ink flow paths formed for the respective nozzles or ejection units such as heaters or actuators corresponding to the respective nozzles.

Another object of the present invention in to provide an inkjet recording head utilizing the above-mentioned liquid droplet ejection apparatus.

In order to attain the object described above, the first aspect of the invention is to provide a liquid droplet ejection apparatus comprising a liquid holding material which has three-dimensional voids communicating three-dimensionally with one another at least up to a liquid droplet ejection surface, and an array of a plurality of ejection devices each of which applies ejection energy to a part of liquid held in the three-dimensional voids of the liquid holding material thereby ejecting fine liquid droplets from the liquid droplet ejection surface, wherein the fine liquid droplets are ejected in accordance with each of the ejection devices of the array.

Further, in order to attain another object described above, the second aspect of the invention is to provide an inkjet recording head in which a liquid droplet ejection apparatus is used for an ink ejection means as it is or in a form of a one-dimensional, two-dimensional or three-dimensional arrangement, wherein the liquid droplet ejection apparatus comprises a liquid holding material which has three-dimensional voids communicating with one another at least up to a liquid droplet ejection surface and an array of a plurality of ejection devices each of which applies ejection energy to a part of the liquid held in the three-dimensional voids of the liquid holding material thereby ejecting fine liquid droplets from the liquid droplet ejection surface, wherein the fine liquid droplets are ejected in accordance with each of said ejection devices of the array.

Here, each of the ejection devices of the array is preferably driven individually.

Alternatively, two of more of the ejection devices of the array may be driven simultaneously by one driving source.

And, preferably, the liquid holding material is a thin porous material having the three-dimensional voids communicating three-dimensionally with one another at least up to the liquid droplet ejection surface and in directions across the material generally perpendicular to a direction toward the liquid droplet ejection surface.

Preferably, the porous material is a porous film having the three-dimensional voids communicating three-dimensionally with one another at least up to the liquid droplet ejection surface and in directions across the film which are generally perpendicular to the direction toward the liquid droplet ejection surface.

Preferably, each of the ejection devices in the array is disposed on a surface side of the porous material opposite to the liquid droplet ejection surface and is a thrusting means for thrusting a part of the liquid in the porous material in the direction toward the liquid droplet ejection surface.

Preferably, the thrusting means is an actuator which thrusts the porous material and the liquid held therein in the direction toward the liquid droplet ejection surface.

Preferably, the actuator is a bimorph type piezoelectric element.

Preferably, the porous material has elasticity and the thrusting means is disposed in a state in which the thrusting means is substantially in contact with the surface side of the porous material opposite to the liquid droplet ejection surface.

Preferably, the thrusting means uses a heater for heating the liquid to be ejected as the fine liquid droplets to generate an air bubble thereby thrusting a part of the liquid in the porous material in the direction toward the liquid droplet ejection surface.

Preferably, the ejection devices are disposed in a state in which the ejection devices are substantially in contact with a surface side of the liquid holding material opposite to the liquid droplet ejection surface.

Preferably, the fine liquid droplets have a size as defined by a size of each of the ejection devices to be driven.

DETAILED DESCRIPTION OF THE INVENTION

The liquid droplet ejection apparatus and the inkjet recording head using this liquid droplet ejection apparatus according to the invention will now be described in detail on the basis of the preferred embodiments shown in the accompanying drawings.

Figure 1A:
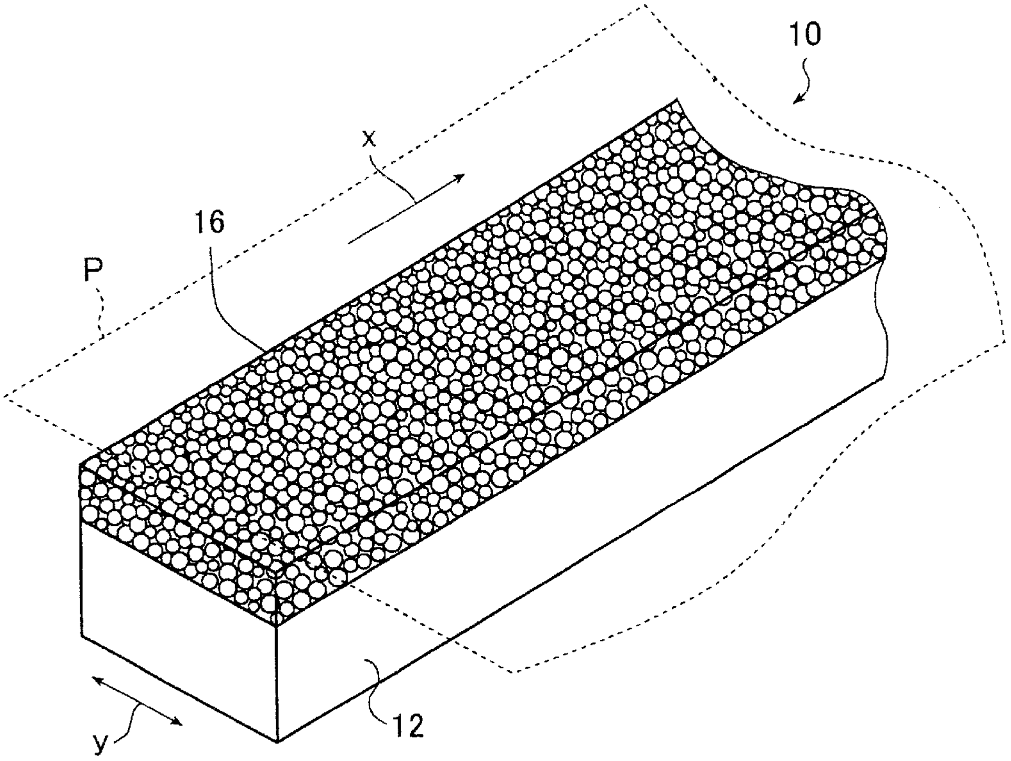
FIGS. 1A and 1B are schematic perspective views showing an embodiment of the inkjet recording head according to the present invention.
Figure 1B:
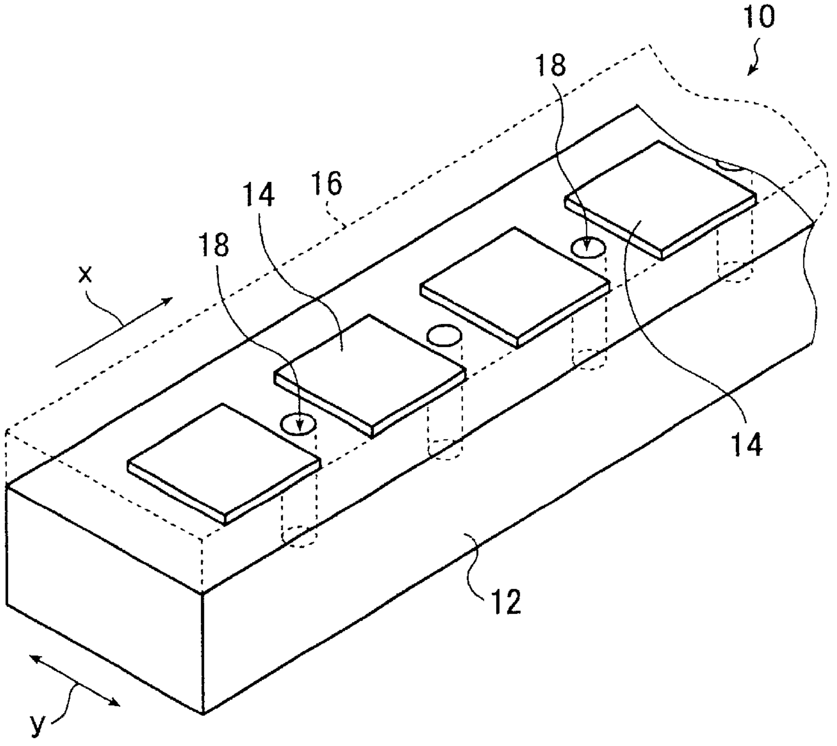

FIGS. 1A and 1B are schematic perspective views showing an embodiment of the inkjet recording head according to the present invention.

The inkjet recording head (hereinafter simply referred to as recording head) 10 shown in FIGS. 1A and 1B utilizes the liquid droplet ejection apparatus according to the present invention and basically comprises a substrate 12, an actuator array including a large number of actuators 14 arranged in one direction indicated by an arrow x in FIG. 1B, and a porous film 16. In FIG. 1B, the porous film 16 is shown by dotted lines.

In the recording head 10 according to the embodiment shown, the upper surface of the porous film 16 (the opposite surface with respect to the substrate 12) is a liquid droplet ejection surface. This surface side will hereinafter be referred to as the surface (liquid droplet ejection surface) side, while the substrate 12 side as the back surface side. Further, in the embodiment shown, one actuator 14 corresponds to a fine ink droplet ejection unit, that is, one nozzle in the ordinary (inkjet) recording head, and the direction of the array of the actuators 14 (the arrowed direction x, which will hereinafter be referred to as the main scan direction) corresponds to the so-called nozzle row direction in an ordinary recording head.

Accordingly, in the case of performing an inkjet image recording by the use of this recording head 10, the surface of the porous film 16 is faced to a sheet of image receiving paper P (shown by dotted lines in FIG. 1A), and ink (fine liquid droplets) is ejected by modulation-driving the actuators 14 as will be described later in accordance with the recording image, while moving the recording head 10 and the image receiving paper relative to each other in an auxiliary scan direction (an arrowed direction y) perpendicular to the main scan direction, whereby the image recording is performed.

The recording head 10 according to the embodiment shown is formed on a Si wafer by utilizing, e.g., the semiconductor manufacturing technology, wherein the substrate 12 is a Si substrate, for example As shown in FIG. 1B, on the surface of this substrate 12, the actuators 14 are formed, and further, on the substrate 12, an LSI, wirings, etc. for driving the actuators 14 are formed.

Further, in the case of the embodiment shown, between the respective actuators 14, ink feed holes 18 for feeding ink (liquid) to the porous film 16 which will be described later are bored through the substrate 12. Accordingly, to the ink feed holes 18, there is connected an ink feed source such as an ink tank disposed in the unit on which this recording head 10 is mounted.

In the present invention, the method of feeding the ink to the porous film 16 is not limited to the use of such through-holes formed in the substrate 12, but the ink may alternatively be fed from an end portion (end face) of the porous film 16, or these two methods may be used both together.

Each of the actuators 14 functions as the ejection device which pushes the porous film 16 in the direction perpendicular to the surface across the porous film 16 (that is, in the direction in which the ink droplets are ejected) to thrust up the porous film 16 together with a liquid held therein, whereby the ink held in the porous film 16 is ejected as fine liquid droplets. As described above, in the embodiment shown, one actuator 14 constitutes an ejection unit for the fine liquid droplets. One fine liquid droplet or an aggregate of fine liquid droplets may be elected by the action of one actuator 14 constituting a fine liquid droplet ejection unit. In the latter case, individual fine liquid droplets may not be completely discrete but partially bound together.

In the embodiment shown, each of the actuators 14 functions as the thrusting device for pushing up the porous film 16 by utilizing actuators of a bimorph structure using PZT, by way of example.

In the present invention, no particular limitation is placed on the actuators 14; as the actuators 14, various film vibrating devices can be used so long as they have a pushing force and a quantity of drive (thrust-up stroke) necessary for ejecting fine liquid droplets from the porous film 16 used. More specifically, there can be used, as the actuators 14, actuators utilizing piezoelectric elements (piezoelectric actuators), actuators that vibrate diaphragms by static electricity as in the case of an electrostatic type inkjet recording head, actuators in which the ink (ink) held in the porous film 16 is pressed (pushed) or thrust up by the pressure of the vaporized ink (air bubbles) obtained by rapidly heating with heaters as in the case of a thermal inkjet recording head, etc.

In the recording head 10 according to the embodiment shown, the porous film 16 is disposed so as to cover the whole surface of the substrate 12.

In the present invention, the porous film 16 is a porous film which has three-dimensional voids communicating with one another at least in the directions across the film and toward the surface open to the space (that is, the liquid droplet ejection surface), so that the porous film 16 allows the ink fed from the ink feed holes 18 to be transferred to penetrate into the whole region of the porous film by capillarity and to be held therein like a sponge for example. The porous film 16 is disposed so that the actuators 14 are located on the back surface side of the porous film 16, and preferably in the state in which the back surface side of the porous film 16 is substantially in contact with the actuators 14. Further, the porous film 16 is displaced by the pushing force of the actuators 14 to eject the ink (liquid) held therein as fine ink droplets.

FIG. 2 shows the concept of the ejection and flight of an ink droplet in the recording head 10 (the liquid droplet ejection apparatus) according to the present invention.

In the recording head 10, the ink fed to the porous film 16 from the ink feed holes 18 is transferred into the whole region of the porous film 16 by capillarity and held therein. In other words, in front of the actuators 14 is formed a thin ink film with a predetermined thickness which is substantially in contact with the actuators 14.

Figure 2A:
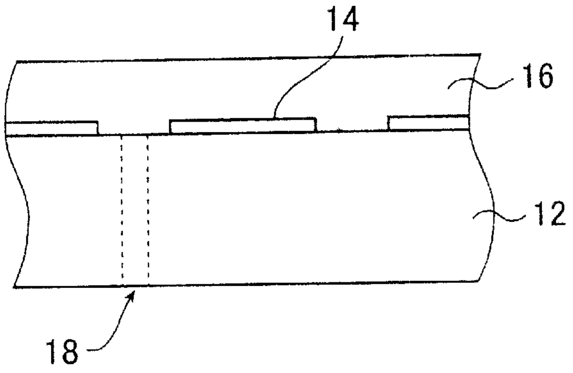
FIGS. 2A to 2D are conceptual diagrams for explaining the ejection of an ink droplet from the inkjet recording head shown in FIGS. 1A and 1B.
Figure 2B:
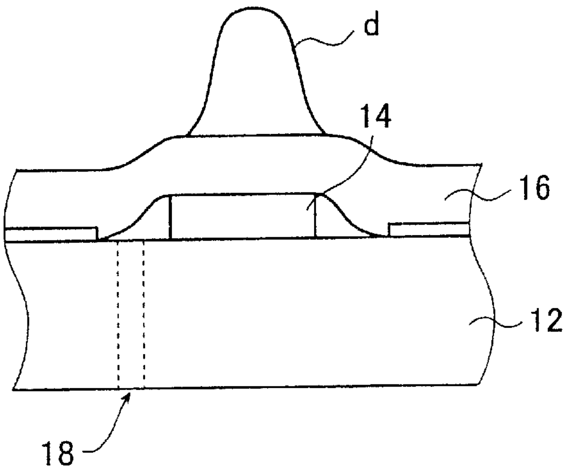

When a driving energy is fed to an actuator 14 in the non-driven state shown in FIG. 2A, the actuator 14 pushes and displaces the porous film 16 substantially in contact therewith toward the direction of its upper surface as shown in FIG. 2B.

Figure 2C:
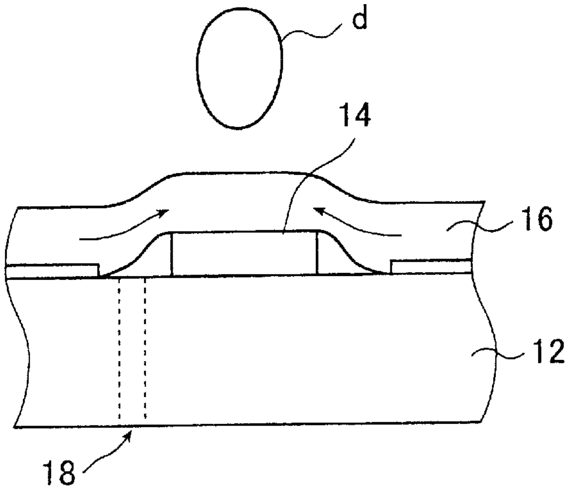
Figure 2D:
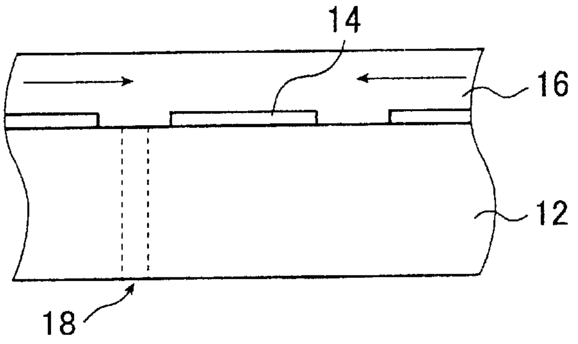

By the displacement of the actuator 14, inertia force (ejection energy) acting in the pushing direction is applied to the ink held in the porous film 16 in this region, so that, as shown in FIGS. 2B and 2C, the ink springs out from the porous film 16 as an ink droplet d and flies as the ink droplet d. The actuator 14 that has been driven is immediately restored to its non-driven state as shown in FIG. 2D. Thus, in the case of continuously ejecting the ink, the actuator 14 appears to be in such a state as if it were vibrating the porous film 16.

In the embodiment shown, the actuators 14 are disposed in the state in which the actuators 14 are substantially in contact with the porous film 16 and thrust up the porous film 16 to apply inertia force (ejection energy) to the ink held therein. However, this is not the sole case of the present intention and the following method may be used. The actuators 14 are spaced apart from the porous film 16 to fill the space therebetween with ink, namely interpose an ink layer therebetween; the actuators 14 are driven to thrust up the ink in the space and apply inertia force thereto, thus applying inertia force to the ink impregnated into the porous film 16 which is adjacent to (or in contact with) the ink layer. The porous film 16 may or may not be deformed.

In the case of the afore-mentioned thermal type actuators using heaters, air bubbles generated by the vaporization of ink may be used to apply inertia force to the ink impregnated into the porous film by directly pushing it up or by pushing it up after the ink in contact with the porous film is first pushed up to apply inertia force thereto such that the ink impregnated into the porous film can be ejected from the liquid droplet ejection surface as fine liquid droplets. In this case, the porous film may or may not be deformed.

Alternatively, in the thermal type, a porous film with elasticity (flexibility) is used; the porous film may be crushed by the vaporization of ink (air bubbles) so that the ink in the porous film can be ejected as fine liquid droplets by using this crushing force and the pressure by the vaporized ink (air bubbles). More specifically, in case of this embodiment, when the ink is continuously ejected, the porous film is brought, by the actuator concerned, into the state in which the porous film continuously repeats its "depressed state→restored state".

Further, to that region of the porous film 16 in which no ink is left as a result of the ejection of ink droplets d or the like, ink is quickly transferred to this region from other regions of the porous film 16 by capillarity; and thus, the above-mentioned region of the porous film 16 is brought again into the state in which ink is permeated into said region and held there, thus effecting a so-called re-filling.

As is apparent from the foregoing description, according to the present invention, the three-dimensional voids (thin holes) of the porous film 16 perform all the functions of nozzles, individual ink feed paths to ink droplet ejection units such as the nozzles, an ink feed device common for the respective ink ejection units, ink holding devices at the ink ejecting positions, and a regulator for regulating the amount of ink droplets.

In other words, according to the present invention, a recording head is constituted of the porous film 16 and the pushing devices for pushing the porous film, whereby a perfectly new (inkjet) recording head (liquid droplet ejection apparatus) is realized which does not comprise nozzles constituting ink droplet ejection units, individual ink flow paths and ink chambers associated with the respective nozzles, and a feed ink flow path for feeding ink to the above-mentioned members, these being indispensable constitutional elements or requirements for a known recording head.

According to the present invention, for the formation of the porous film 16, various materials can be used so long as they can hold a predetermined amount of ink without allowing the unnecessary outward leakage thereof and can eject a predetermined amount of ink (more preferably, can eject the whole ink in the region concerned) as fine liquid droplets by driving the actuators 14.

Further, the volume of one ejection unit of fine liquid droplets ejected by driving the actuator 14 once is, basically, determined depending on the thickness and porosity of the porous film 16, the area, stroke, pushing force, pushing speed, etc. of the actuator 14.

According to the present invention, the porous material that constitutes the porous film 16 is selected by taking into account the rigidity, elasticity and flexibility (Elasticity and flexibility, are particularly required in case of the type that uses above-mentioned heaters), pore diameter, porosity (voids), thickness, etc. so as to realize the intended ink ejection in accordance with the amount of ink droplets ejected as one ejection unit, the kind (the viscosity, specific gravity, etc.) of the ink used, etc. Further, the actuators 14 are selected and designed by taking into account the necessary pushing force (pressing force), the pushing speed, stroke, etc. thereof.

More specifically, as the porous film 16, there is used a porous film whose pores have a pore diameter of about 0.01 $\mu$m to 10 $\mu$m.

As a preferred actual material for the porous film 16, PSE (pore diameter of 0.1 $\mu$m to 0.45 $\mu$m; manufactured by Fuji Photo Film Co., Ltd.) manufactured by the use of the micro phase separation method (phase transformation method), etc. are pointed out by way of example.

According to the present invention, the porous film 16 is required only to be constituted in such a manner that the three-dimensional voids communicate with one another in the directions along the film surface and in the film thickness direction up to the upper surface (liquid droplet ejection surface), and that the actuators 14 are disposed on the back surface side of the porous film 16 and preferably in a state in which their surfaces are substantially in contact with the porous film 16.

Accordingly, in order to protect the actuators 14, etc. from the ink for example, an ink non-transmissible sheet or the like may be provided between the porous film 16 and the actuators 14 (or, in addition, between the porous film 16 and the portion of the substrate 12 excepting the ink feed holes 1). Or, a sheet (plate) through which ink-ejecting openings corresponding to the respective actuators 14 are formed may be disposed on the surface of the porous film 16 unless this sheet disturbs the porous film 16 being pushed and moved.

The recording head 10 (liquid droplet ejection apparatus) of the present invention that is constituted as mentioned above can be manufactured by the utilization of the known semiconductor manufacturing technology using a Si wafer or the like as mentioned above.

Figure 3A:
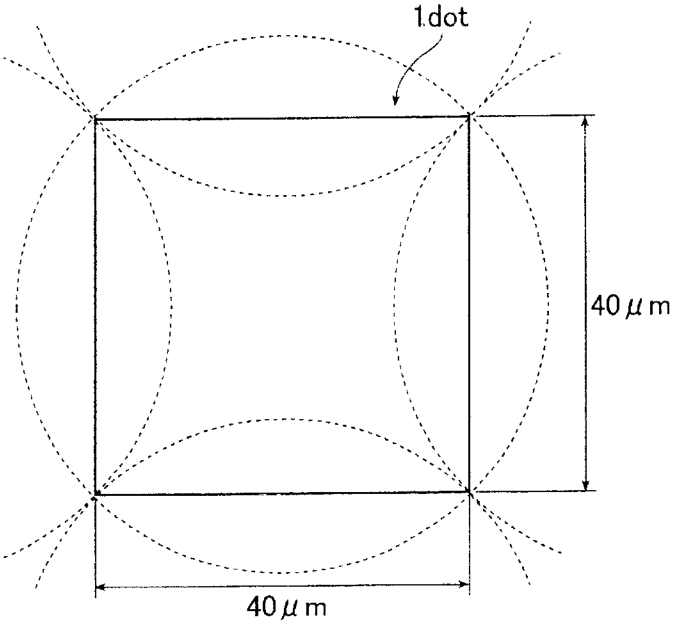
FIGS. 3A to 3C are conceptual diagrams for explaining an example of the image recording by the inkjet recording head according to the present invention.
Figure 3B:
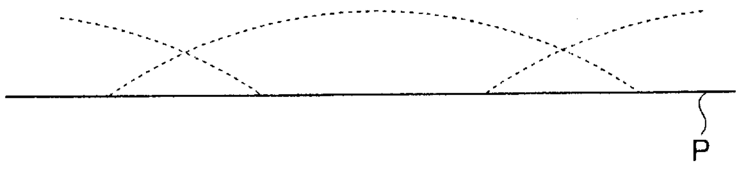

By the way, in order to realize a recording density of, e.g., 600 dpi in the inkjet image recording, the ejection of ink droplets as shown by dotted lines in FIGS. 3A and 3B becomes necessary so as to make it possible to obtain a solid image (an image with a uniform density) having a maximum density, on the assumption that one dot is 40 μm×40 μm. If, in this case, it is assumed that the angle of contact between the image receiving paper P and the ink is 30°, then an ink droplet amounting to about 10 pL (liter) per dot become necessary.

Figure 3C:
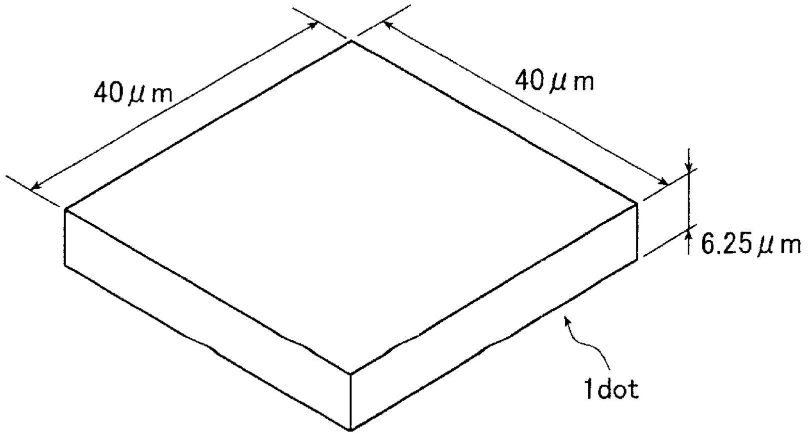

In this example, as conceptually shown in FIG. 3C, the thickness and porosity of the porous film 16 constituting the recording head 10 and, further, the area, stroke, etc. of the actuators 14 are selected and set so that the ejection of an ink droplet corresponding to 1 dot=40 μm×40 μm×6.25 μm can be made by driving an actuator 14 once.

Here, it is known that, for the enhancement in speed of the inkjet image recording, it is effective to reduce the ink droplet amount per dot.

Figure 4A:
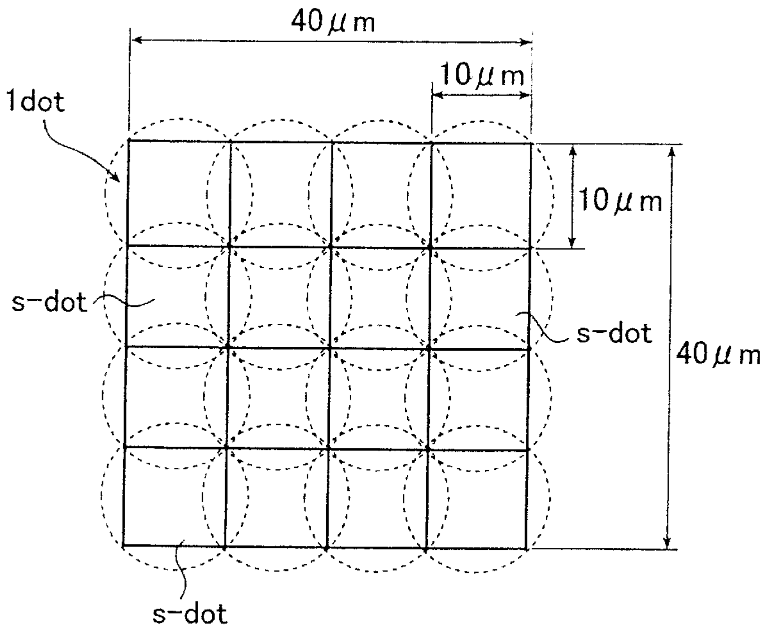
FIGS. 4A to 4C are conceptual diagrams for explaining another example of the image recording by the inkjet recording head according to the present invention.
Figure 4B:
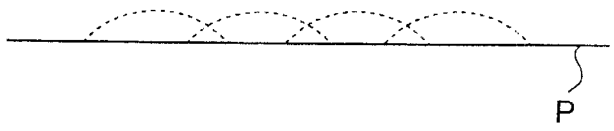

The examination made by the present inventor reveals that, as shown in FIGS. 4A and 4B for example, by dividing 40 μm×40 μm corresponding to 600 dpi into 16 blocks each comprising 10 μm×10 μm (The thus divided dots will hereinafter be referred to as s-dots) and constituting one dot by the use of 16 fine ink droplets for s-dots (shown by dotted lines), a solid image with a maximum density can be expressed with an ink amount of 0.16 pL×16=2.56 pL on the condition that the angle of contact is the same 30°. Thus, the ink amount can be reduced by about 7 pL.

Figure 4C:
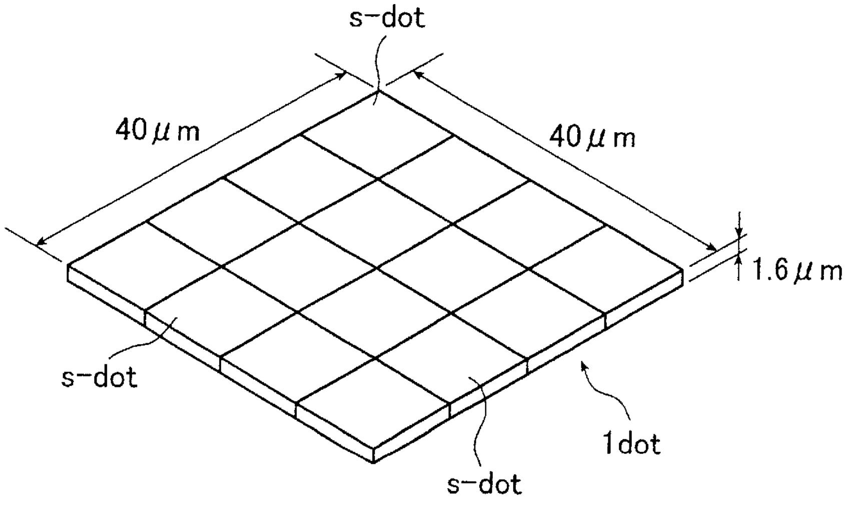
Figure 5:
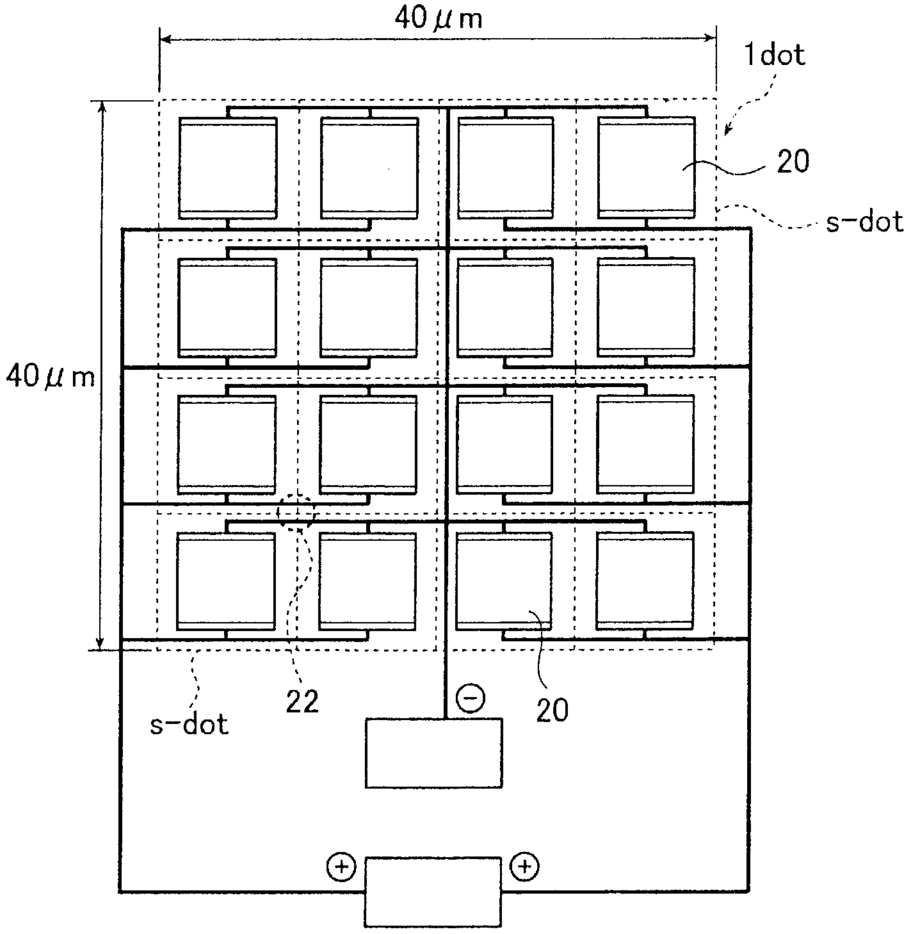
FIG. 5 is a schematic diagram showing another embodiment of the inkjet recording head of the present invention.

In the recording head according to the present invention, sixteen actuators 20 that each correspond to an s-dot of 10 μm×10 μm are arranged in a liquid droplet ejection region corresponding to one dot of 40 μm×40 μm as shown in FIG. 5, and at the same time, the thickness and porosity of the porous film 16 and, further, the stroke, etc. of the actuators 20 are selected and set so that, by driving an actuator 20 once, the ejection of fine ink droplets for one s-dot=10 μm×10 μm×1.6 μm can be performed as conceptually shown in FIG. 4C, whereby this can be realized.

In order to realize an image recording as discussed above in conjunction with FIGS. 4*a–c* by the used of a known (inkjet) recording head, four rows of nozzles corresponding to 2400 npi (nozzle/inch) must be disposed side by side; this is substantially impossible.

In contrast, the recording head according to the present invention can be fabricated by utilizing the semiconductor manufacturing technology as mentioned above, and it is easy to, e.g., render the actuators into a further minute structure. In addition, due to the constitution of the recording head according to the present invention that does not hare any individual ink flow paths or common ink flow path, it can also be easily done to arrange two-dimensionally the actuators 20, that is, the fine ink droplet ejection units corresponding to the s-dots unlike in the case of the known recording head. Further, according to the recording method shown in FIG. 4, the dimension in the thickness direction of the dots can be reduced, so that the thickness of the porous film 16, the stroke and pushing force of the actuators 20, etc. can be largely reduced; and thus, the recording head according to the present invention is advantageous in respect of the selectivity, cost, etc. of the actuators 20.

In the case of expressing one dot by the use of a plurality of s-dots in the recording head (liquid droplet ejection apparatus) according to the present invention, the actuators 20 corresponding to the respective s-dots need not be separately driven, but a plurality of actuators 20 or all the actuators 20 as shown in FIG. 5 may be driven simultaneously by one driving source.

In this case, moreover, ink feed holes 22 may be formed in the areas between the actuators 20 as shown by dotted lines in FIG. 5.

Further, the number into which one dot is divided is not limited to 16, but, for example, in performing an image recording similarly with a recording density of 600 dpi, each s-dot can be set to 5 μm×5 μm so that one dot may be expressed by 8×8=64 s-dots.

In case of the present invention according to which the two-dimensional arrangement of actuators (ink ejection devices) is easily made, it is also possible to reduce the amount of ink ejected by each actuator in such a manner that a plurality of ink ejection units each expressing one dot are arranged in the auxiliary scan direction to record the image time-divisionally.

Figure 6:
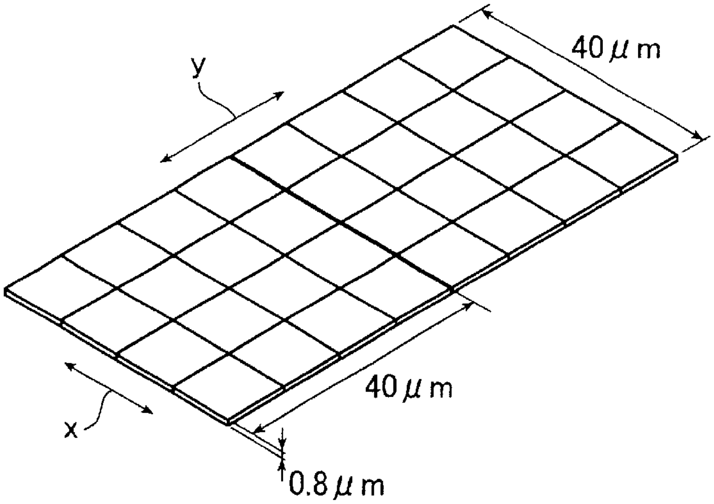
FIG. 6 is a conceptual diagram for explaining still another example of the image recording by the inkjet recording head according to the present invention.

For example, in the case of expressing one dot by the use of 16 s-dote as shown in FIG. 4, the density of one dot may be expressed by performing a time-divisional ink ejection in such a manner that two rows of ink ejection units for expressing each dot by 4×4=16 s-dots are arranged in the auxiliary scan direction (in the arrowed direction y) as conceptually shown in FIG. 6. As a result, the dimension, in the thickness direction of the dot, of the ink ejected by driving the actuator 20 once can be made 0.8 μm as according to a simple calculation.

Further, the number of ink ejection units expressing one dot as mentioned above may be two or more; for example, by similarly disposing sixteen ink ejection units, the above-mentioned dimension can be made 0.1 μm according to a simple calculation, and therefore, the stroke and pushing force of the actuators 20 can be substantially reduced, which proves to be advantageous in respect of the selectivity, cost, etc. of the actuators 20.

In the embodiments described above, the porous film 16 is used as the liquid holding material of the present invention. However, the present invention is not limited thereto and may use any liquid holding material as exemplified by a thin porous material as far as the liquid holding material used has three-dimensional voids communicating with one another at least up to the liquid droplet ejection surface. In addition, an exchangeable porous film capable of holding gel ink and a porous film for carrying gel ink may be used for the liquid holding material of the present invention. These porous films which do not require any liquid system for ink replenishment or any driving system such as a pump are easy to replace. Therefore, the porous film can be replaced to perform printing, painting or coating. The porous film is easy to handle and may be of a disposable type. The present invention is also advantageous in that the liquid droplet ejection apparatus and the inkjet recording head can be made more compact.

The inkjet recording head of the present invention may be a type in which the liquid droplet ejection apparatus of the present invention comprising a one-dimensional array of actuators as in the recording head 10 shown in FIG. 1 is used as it is for a one-dimensional head; a type in which the liquid droplet ejection apparatuses of the present invention are arranged one-dimensionally and used for a long line head (one-dimensional head); a type in which the liquid droplet ejection apparatus of the present invention comprising a two-dimensional array of actuators as in the recording head shown in FIG. 5 is used as it is for a two-dimensional head;

or a type in which the liquid droplet ejection apparatuses of the present invention each comprising a one-dimensional array of actuators are arranged in a direction perpendicular to the direction in which the actuators are arranged and used for a two-dimensional head.

In addition, the inkjet recording head of the present invention may be formed by using the liquid droplet ejection apparatus of the present invention comprising a three-dimensional array of actuators as it is or by three-dimensionally arranging the liquid droplet ejection apparatuses of the present invention each comprising a one-dimensional or two-dimensional array of actuators. More specifically, a three-dimensional head in which one-dimensional or two-dimensional heads are three-dimensionally arranged so as to conform with the shape of the outer peripheral surface of the cylindrical drum may be used for the inkjet recording head of the present invention thereby recording on the image receiving paper attached to the outer peripheral surface of the drum.

In the above, the liquid droplet ejection apparatus and the inkjet recording head according to the present invention have been described in detail. However, the present invention is not limited to the foregoing embodiments, but it is a matter of course that the invention may be variously improved and altered without departure from the technical scope of the invention.

For example, in the case of the foregoing embodiments, the liquid droplet ejection apparatuses according to the present invention are utilized in inkjet printers. However, the invention is not limited to these embodiments but can also be applied to various other liquid droplet ejection apparatuses; the present invention can be suitably utilized not only in inkjet recording heads but also in apparatuses for, e.g., applying bonding agents in fine patterns.

As has been described in detail above, according to the present invention, a novel liquid droplet ejection apparatus that does not have nozzles, individual ink feed paths to the respective nozzles, a common ink feed path to the individual ink feed paths, etc., which are all indispensable for the known liquid droplet ejection apparatuses, and a novel inkjet recording head using this liquid droplet ejection apparatus are provided.

What is claimed is:

1. A liquid droplet ejection apparatus comprising:

a liquid holding material which has three-dimensional voids communicating three-dimensionally with one another at least up to a liquid droplet ejection surface; and an array of a plurality of ejection devices each of which applies a mechanical force for ejection to a part of liquid held in the three-dimensional voids of the liquid holding material thereby ejecting fine liquid droplets from the liquid droplet ejection surface, wherein said fine liquid droplets are ejected in accordance with each of said ejection devices of the array.

2. The liquid droplet ejection apparatus according to claim 1, wherein said liquid holding material is a thin porous material having the three-dimensional voids communicating three-dimensionally with one another at least up to the liquid droplet ejection surface and in directions across the material generally perpendicular to a direction toward the liquid droplet ejection surface.

3. The liquid droplet ejection apparatus according to claim 2, wherein said porous material is a porous film having the three-dimensional voids communicating three-dimensionally with one another at least up to the liquid droplet ejection surface and in directions across the film which are generally perpendicular to the direction toward the liquid droplet ejection surface.

4. The liquid droplet ejection apparatus according to claim 2, wherein each of said ejection devices in the array is disposed on a surface side of the porous material opposite to the liquid droplet ejection surface and is a thrusting means for thrusting a part of the liquid in the porous material in the direction toward the liquid droplet ejection surface.

5. The liquid droplet ejection apparatus according to claim 4, wherein said thrusting means is an actuator which thrusts the porous material and the liquid held therein in the direction toward the liquid droplet ejection surface.

6. The liquid droplet ejection apparatus according to claim 5, wherein said actuator is a bimorph type piezoelectric element.

7. The liquid droplet ejection apparatus according to claim 4, wherein said porous material has elasticity and said thrusting means is disposed in a state in which said thrusting means is substantially in contact with the surface side of the porous material opposite to the liquid droplet ejection surface.

8. The liquid droplet ejection apparatus according to claim 4, wherein said thrusting means uses a heater for heating the liquid to be ejected as the fine liquid droplets to generate an air bubble thereby thrusting a part of the liquid in the porous material in the direction toward the liquid droplet ejection surface.

9. The liquid droplet ejection apparatus according to claim 1, wherein said ejection devices are disposed in a state in which said ejection devices are substantially in contact with a surface side of the liquid holding material opposite to the liquid droplet ejection surface.

10. The liquid droplet ejection apparatus according to claim 1, wherein said fine liquid droplets have a size as defined by a size of each of said ejection devices to be driven.

11. The liquid droplet ejection apparatus according to claim 1, wherein each of said ejection devices in the array applies directly or indirectly mechanical energy for ejection to the part of the liquid held in the three-dimensional voids of the liquid holding material and thereby exerts the mechanical force for ejection on the part of the liquid.

12. An inkjet recording head in which a liquid droplet ejection apparatus is used for an ink ejection means as it is or in a form of a one-dimensional, two-dimensional or three-dimensional arrangement, wherein said liquid droplet ejection apparatus comprises:

a liquid holding material which has three-dimensional voids communicating three-dimensionally with one another at least up to a liquid droplet ejection surface; and an array of a plurality of ejection devices each of which applies a mechanical force for ejection to a part of liquid held in the three-dimensional voids of the liquid holding material thereby ejecting fine liquid droplets from the liquid droplet ejection surface, wherein said fine liquid droplets are ejected in accordance with each of said ejection devices of the array.

13. The inkjet recording head according to claim 12, wherein said liquid holding material is a thin porous material having the three-dimensional voids communicating three-dimensionally with one another at least up to the liquid droplet ejection surface and in directions across the material generally perpendicular to a direction toward the liquid droplet ejection surface.

14. The inkjet recording head according to claim 13, wherein said porous material is a porous film having the three-dimensional voids communicating three-dimensionally with one another at least up to the liquid droplet ejection surface and in directions across the film which are generally perpendicular to the direction toward the liquid droplet ejection surface.

15. The inkjet recording head according to claim 13, wherein each of said ejection devices in the array is disposed on a surface side of the porous material opposite to the liquid droplet ejection surface and is thrusting means for thrusting a part of the liquid in the porous material in the direction toward the liquid droplet ejection surface.

16. The inkjet recording head according to claim 15, wherein said thrusting means is an actuator which thrusts the porous material and the liquid held therein in the direction toward the liquid droplet ejection surface.

17. The inkjet recording head according to claim 16, wherein said actuator is a bimorph type piezoelectric element.

18. The inkjet recording head according to claim 15, wherein said porous material has elasticity and said thrusting means is disposed in a state in which said thrusting means is substantially in contact with the surface side of the porous material opposite to the liquid droplet ejection surface.

19. The inkjet recording head according to claim 15, wherein said thrusting means uses a heater for heating the liquid to be ejected as the fine liquid droplets to generate an air bubble thereby thrusting a part of the liquid in the porous material in the direction toward the liquid droplet ejection surface.

20. The inkjet recording head according to claim 12, wherein said ejection devices are disposed in a state in which said ejection devices are substantially in contact with a surface side of the liquid holding material opposite to the liquid droplet ejection surface.

21. The inkjet recording head according to claim 12, wherein said fine liquid droplets have a size as defined by a size of each of said ejection devices to be driven.

22. The inkjet recording head according to claim 12, wherein each of said ejection devices in the array applies directly or indirectly mechanical energy for ejection to the part of the liquid held in the three-dimensional voids of the liquid holding material and thereby exerts the mechanical force for ejection on the part of the liquid.

* * * * *